(12) United States Patent
Stauffer

(10) Patent No.: US 10,293,304 B2
(45) Date of Patent: May 21, 2019

(54) CARBON DIOXIDE RECOVERY USING AN ABSORPTION COLUMN IN COMBINATION WITH OSMOTIC FILTERS

(71) Applicant: John E. Stauffer, Greenwich, CT (US)

(72) Inventor: John E. Stauffer, Greenwich, CT (US)

( * ) Notice: Subject to any disclaimer, the term of this patent is extended or adjusted under 35 U.S.C. 154(b) by 0 days.

(21) Appl. No.: 15/835,609

(22) Filed: Dec. 8, 2017

(65) Prior Publication Data

US 2018/0099248 A1 Apr. 12, 2018

Related U.S. Application Data

(63) Continuation-in-part of application No. 15/600,043, filed on May 19, 2017, now abandoned, which is a continuation-in-part of application No. 14/798,827, filed on Jul. 14, 2015, now abandoned, which is a continuation-in-part of application No. 14/954,172, filed on Nov. 30, 2015, now abandoned.

(51) Int. Cl.
| | |
|---|---|
| *B01D 61/58* | (2006.01) |
| *B01D 61/00* | (2006.01) |
| *B01D 61/02* | (2006.01) |
| *B01D 61/24* | (2006.01) |
| *B01D 61/36* | (2006.01) |
| *B01D 61/38* | (2006.01) |
| *B01D 53/14* | (2006.01) |
| *B01D 53/62* | (2006.01) |
| *B01D 53/78* | (2006.01) |
| *B01D 53/96* | (2006.01) |

(52) U.S. Cl.
CPC ......... *B01D 53/62* (2013.01); *B01D 53/1425* (2013.01); *B01D 53/1475* (2013.01); *B01D 53/1493* (2013.01); *B01D 53/78* (2013.01); *B01D 2251/304* (2013.01); *B01D 2251/306* (2013.01); *B01D 2251/60* (2013.01); *B01D 2252/102* (2013.01); *B01D 2252/20405* (2013.01); *B01D 2252/20421* (2013.01); *B01D 2252/20484* (2013.01); *B01D 2258/0283* (2013.01); *Y02A 50/2342* (2018.01); *Y02C 10/04* (2013.01); *Y02C 10/06* (2013.01)

(58) Field of Classification Search
None
See application file for complete search history.

(56) References Cited

U.S. PATENT DOCUMENTS

| | | |
|---|---|---|
| 1,849,844 A | 3/1932 | Joseph et al. |
| 2,276,192 A | 3/1942 | Hanford et al. |
| 3,887,689 A | 6/1975 | Carding et al. |
| 4,364,915 A | 12/1982 | Proctor |
| 4,562,174 A | 12/1985 | Stiles |
| 4,825,004 A | 4/1989 | Rutzen et al. |
| 4,913,842 A | 4/1990 | Yoneoka et al. |
| 5,070,016 A | 12/1991 | Hallberg |
| 5,395,991 A | 3/1995 | Scarlett et al. |
| 5,449,696 A | 9/1995 | Dandekar et al. |
| 5,453,412 A | 9/1995 | Deckers et al. |
| 5,663,429 A | 9/1997 | Yamaseki et al. |
| 6,114,279 A | 9/2000 | Fukui et al. |

(Continued)

*Primary Examiner* — Daniel Berns
(74) *Attorney, Agent, or Firm* — Young Basile Hanlon & MacFarlane, P.C.

(57) ABSTRACT

A process for the removal of $CO_2$ from flue gases using a co-current flow absorption column followed by one or more serial osmotic filters. The permeate is heated to strip out the $CO_2$. Both sides of the filters are fed back to the column input.

1 Claim, 1 Drawing Sheet

(56) References Cited

U.S. PATENT DOCUMENTS

| | | | |
|---|---|---|---|
| 6,140,545 | A | 10/2000 | Merger et al. |
| 6,274,108 | B1 | 8/2001 | Fujii et al. |
| 6,452,058 | B1 | 9/2002 | Schweizer et al. |
| 6,486,368 | B1 | 11/2002 | Zhou et al. |
| 6,632,330 | B1 | 10/2003 | Colley et al. |
| 7,199,276 | B2 | 4/2007 | Sher et al. |
| 7,214,721 | B2 | 5/2007 | Eastland |
| 7,288,689 | B2 | 10/2007 | Janssen et al. |
| 7,696,390 | B2 | 4/2010 | Stauffer |
| 7,977,272 | B2 | 7/2011 | Miller et al. |
| 8,323,602 | B2 | 12/2012 | Wright et al. |
| 8,440,868 | B2 | 5/2013 | Stauffer |
| 8,512,460 | B2 | 8/2013 | Moniwa et al. |
| 8,545,701 | B2 | 10/2013 | Kelada |
| 8,581,010 | B2 | 11/2013 | Stauffer |
| 8,728,423 | B2 | 5/2014 | Iijima et al. |
| 8,795,415 | B2 | 8/2014 | Katz et al. |
| 8,961,664 | B2 | 2/2015 | Nakayama et al. |
| 9,155,991 | B2 | 10/2015 | Ogawa et al. |
| 2007/0282018 | A1 | 12/2007 | Jenkins et al. |
| 2008/0269519 | A1 | 10/2008 | Miller et al. |
| 2010/0086983 | A1 | 4/2010 | Gellett et al. |
| 2010/0196244 | A1 | 8/2010 | Grauer et al. |
| 2011/0293968 | A1 | 12/2011 | Leung et al. |
| 2012/0259145 | A1 | 10/2012 | Stauffer |
| 2014/0199228 | A1 | 7/2014 | Kniesburges |
| 2017/0080389 | A1 | 3/2017 | Kelada |
| 2017/0206992 | A1 | 7/2017 | Hong et al. |

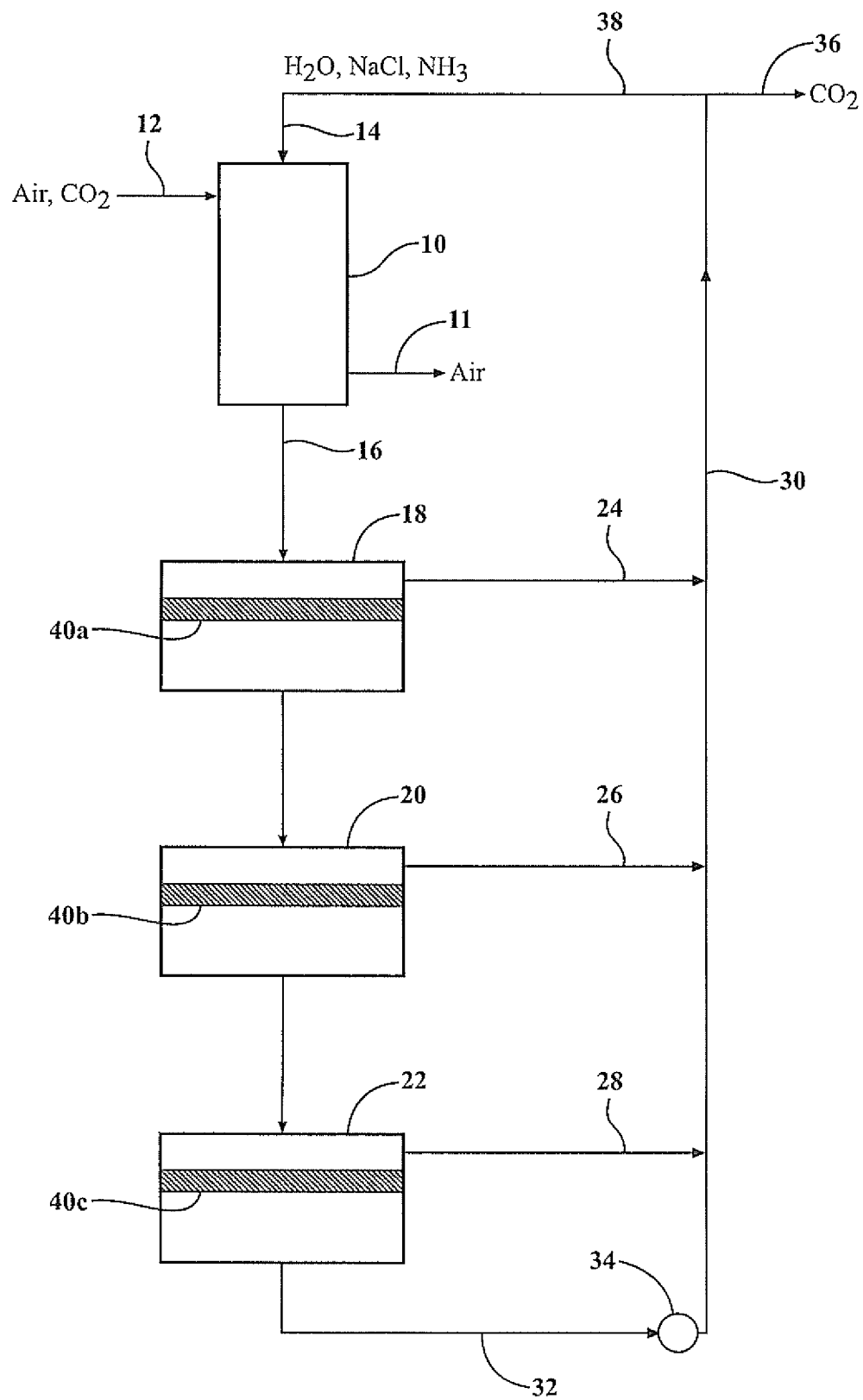

CARBON DIOXIDE RECOVERY USING AN ABSORPTION COLUMN IN COMBINATION WITH OSMOTIC FILTERS

CROSS REFERENCE TO RELATED APPLICATIONS

This application is a continuation-in-part of U.S. patent application Ser. No. 14/954,172 filed Nov. 30, 2015, and is also a continuation-in-part of U.S. patent application Ser. No. 15/600,043 filed May 19, 2017, which is a continuation-in-part of Ser. No. 14/798,827 filed Jul. 14, 2015 (now abandoned). The content of all related applications are incorporated herein by reference.

FIELD OF THE INVENTION

The present invention is in the field of carbon dioxide recovery from flue gases. The process described incorporates a gravity fed co-current absorption column in combination with one or more serially arranged osmotic filters.

BACKGROUND OF THE INVENTION

There is growing concern for the release of greenhouse gases into the atmosphere including in particular carbon dioxide because of its ability to trap heat. Technology exist for the recovery of carbon dioxide from flue gases; i.e. gases resulting from the combustion of coal, oil and/or natural gas, but to date the application of this know how has been limited. Focusing on the recovery of carbon dioxide while ignoring the questions of storage and disposal two approaches for carbon capture have been proposed. Carbon dioxide can either be recovered by absorption on a solid absorbent or dissolved in an aqueous solution. In the first instance, such solid materials can include carbon, small zeolites and metal organics. Absorption, however, presents challenges in that care must be taken to avoid attrition of the solid absorbent The proposal for carbon capture in a solvent commonly involves an aqueous solution of amine. The amine of choice is monoethanolamine. While this solvent is sufficient in scrubbing flue gases, its regeneration is problematic because of the need for relatively high temperatures.

BRIEF SUMMARY OF THE INVENTION

The present invention is a process for the recovery of carbon dioxide from flue gases of the type resulting from the combustion of coal, oil and/or natural gas and using a gravity fed co-current absorption column charged with an aqueous of salt and an amine to absorb carbon dioxide from the input flue gas. The column is followed by one or more osmotic filters in series from which the retentate is cycled back to the column input while the permeate is heated to strip out the carbon dioxide.

BRIEF DESCRIPTION OF THE DRAWING

FIG. 1 is a schematic drawing of a system for carry out the process of the present invention.

DETAILED DESCRIPTION

The present invention can best be appreciated by reviewing the relevant chemistry. Chemical reactions that occur are unique to the process. They indicate the principal advantages, namely, the efficiency of removing carbon dioxide from a gas stream and the ease with which the solvent can thereafter be filtered and regenerated.

In the first step of the process when the gas stream is contacted with the aqueous solution the following chemical reactions take place:

$$NH_3 + CO_2 + H_2O \rightarrow NH_4HCO_3 \quad\quad 1.$$

$$NH_4HCO_3 + NaCl \rightarrow NaHCO_3 + NH_4Cl \quad\quad 2.$$

In the first equation ammonia reacts rapidly with carbon dioxide and water to provide ammonia bicarbonate. The second equation shows the rearrangement of ammonia bicarbonate with salt to give sodium bicarbonate and ammonia chloride. By combining these two reactions the following expression is obtained for the overall reaction in the absorption step.

$$NH_3 + CO_2 + H_2O + NaCl \rightarrow NaHCO_3 + NH_4Cl \quad\quad 3.$$

The regeneration of the aqueous solution is shown by the following two equations.

$$2\, NaHCO_3 \rightarrow Na_2CO_3 + H_2O + CO_2\uparrow \quad\quad 4.$$

$$Na_2CO_3 + NH_4Cl \longrightarrow NaHCO_3 + NaCl + NH_3 \quad\quad 5.$$

The decomposition of sodium bicarbonate to give sodium carbonate and release carbon dioxide is indicated by equation 4. This reaction occurs under the application of heat. Finally, sodium carbonate, strongly alkaline in solution, reacts with ammonium chloride to form sodium bicarbonate, salt, and ammonia. When equations 4 and 5 are combined, the following equation is obtained showing the regeneration process.

$$NaHCO_3 + NH_4Cl \rightarrow \rightarrow NH_3 + NaCl + H_2O + CO_2\uparrow \quad\quad 6.$$

As one can see from this expression, the resulting solution containing ammonia and salt is identical to the solution used in scrubbing carbon dioxide shown in equation 3. Thus, the regenerated solution can be recycled to the absorption step.

The conditions of the process are important. The absorption step is conducted at atmospheric pressure or close to this level. The temperature for absorption is in the range of about 15° C. to approximately 50° C. Below this range, sodium bicarbonate begins to precipitate from solution causing fouling of the equipment. Above this range, carbon dioxide is released.

This regenerative step uses relatively mild conditions. The pressure of the process remains the same as in step one. The temperature is raised to a point in the range of 50 C. to 120° C., but a level below boiling is generally sufficient for the complete evolution of carbon dioxide.

Because of the limited solubility of sodium bicarbonate, sodium chloride in the scrubbing solution can be replaced by potassium chloride. The resulting chemistry is essentially the same.

Also, an amine can be substituted for ammonia in the process. For example, n-propylamine has a boiling point of 49° C. and is miscible in water. Recourse to the common solvent monoethanolamine is also possible.

FIG. 1 represents a co-current flow system that minimizes the loss of ammonia. The apparatus comprises a modified gravity fed absorption column 10 fed with the flue gas containing carbon dioxide at 12 and the solvent comprises an aqueous solution of sodium chloride and ammonia at input 14. The flows are co-current downwardly by gravity through the absorption column 10 with vent air exiting at 11 while the carbon dioxide charged solvent exits on line 16 and enters the first of three osmotic filters 18, 20 and 22 each of which has an osmotic filter membrane 40*a*, 40*b* and 40*c* respectively. The retentate sides of the filters 18, 20 and 22 are recycled by way of lines 24, 26 and 28 respectively to line 30 which runs back to the input 14 of the absorption column. The permeate sides of the filters 18, 20 pass to the next filter and exit from the final filter in series on line 32 and are heated at 34 to a temperature approximately 50° C. to 120° C. and flow by way of line 30 back to line 38 where the carbon dioxide is stripped out on line 36 while the solvent returns to the absorption column 10 by way of line 38. The column 10 operates at a temperature of about 15° C. to 50° C.

In summary, the process of the present invention is directed toward the recovery of carbon dioxide from flue gases using a gravity fed co-current absorption column charged with an aqueous solution of salt and amine to absorb carbon dioxide from the input flue gas. The column is followed by one or more osmotic filters from which the retentate is cycled back to column input while the permeates are heated to 50° C. to 120° C. to strip out the carbon dioxide. The column recycles the solvent and operates at a temperature between about 15° C. and 50° C.

EXAMPLE

Half a cup of ammonia solution used by consumers as an "all-purpose cleaner" was added to half cup of sparkling carbonated water. After complete mixing, 1¼ teaspoons of salt were added to the solution and stirred vigorously. No bubbles appeared. Next, the solution was heated to temperatures describe above. Considerable foaming occurred shortly before the solution began to boil and released carbon dioxide.

What is claimed:

1. A process for the recovery of carbon dioxide from flue gas through the use of a gravity fed absorption column followed by a series of osmotic filters comprising the steps of:
   a. feeding a flue gas containing carbon dioxide to the input of a column co-currently with a solvent consisting of an aqueous solution of salt and ammonia so that the flue gas and the solvent flow by gravity through the column and the solvent absorbs the carbon dioxide in the flue gas;
   b. exhausting air from the column;
   c. causing the carbon dioxide charged solvent to then pass thru a series of osmotic filters each of which includes an osmotic membrane defining retentate and permeate sides;
   d. feeding the content of the retentate sides back to the input of the column;
   e. feeding the content of the permeate sides of the filters in the series to the retentate side of the next following filter in the series;
   f. feeding the content of the permeate side of the final filter in the series to a heater which heats the content to a temperature in the range of approximately 50° C. to 100° C. and, thereafter;
   g. stripping the carbon dioxide out of the heated content of the final filter and, feeding the resultingly stripped aqueous solution back to the input of the column.

* * * * *